United States Patent
Fujimori et al.

(10) Patent No.: US 6,404,770 B1
(45) Date of Patent: Jun. 11, 2002

(54) DATA COMMUNICATION INTERFACE WITH ADJUSTABLE-SIZE BUFFER

(75) Inventors: Junichi Fujimori; Yoshihiro Inagaki, both of Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/196,955

(22) Filed: Nov. 20, 1998

(30) Foreign Application Priority Data

Dec. 2, 1997 (JP) .............................................. 9-347234

(51) Int. Cl.[7] .............................................. H04L 12/54
(52) U.S. Cl. ........................ 370/429; 370/389; 370/391; 370/400
(58) Field of Search ................................ 370/235, 389, 370/391, 400, 428, 429

(56) References Cited

U.S. PATENT DOCUMENTS

| | | | |
|---|---|---|---|
| 5,247,626 A | * 9/1993 | Firoozmand | ................ 370/421 |
| 5,268,900 A | * 12/1993 | Hluchyj et al. | ............. 370/355 |
| 5,616,879 A | 4/1997 | Yamauchi et al. | |

FOREIGN PATENT DOCUMENTS

JP 9-93250 4/1997

* cited by examiner

*Primary Examiner*—Hassan Kizou
*Assistant Examiner*—Tim Spafford
(74) *Attorney, Agent, or Firm*—Morrison & Foerster LLP

(57) ABSTRACT

For data packet communication between a plurality of nodes via a communication network, a data communication interface device is used in at least one of a transmitting end and a receiving node. The interface device includes a plurality of interface chips each including a storage section of a predetermined capacity for buffering a data packet to be transmitted or having been received via the communication network, and a control section for controlling each of the interface chips to thereby control transmission or reception of the data packet to or from the communication network. The number of the interface chips to be connected to the control section is optionally selectable in such a manner that an overall buffer storage size in the interface device can be freely adjusted by just increasing or decreasing the number of the interface chips.

14 Claims, 4 Drawing Sheets

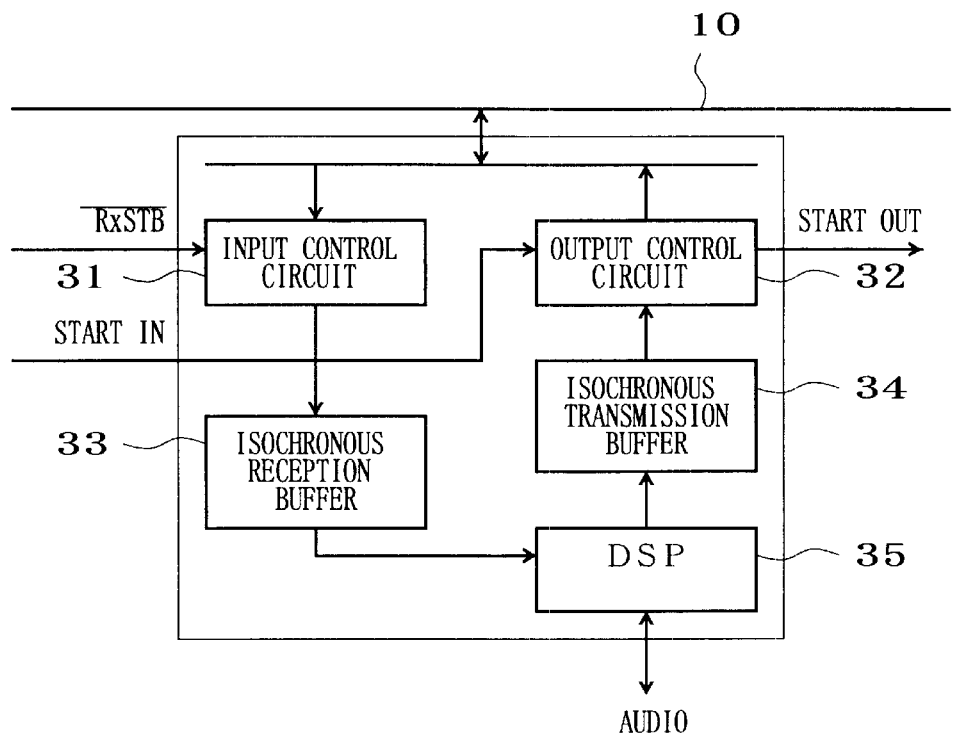
F I G. 3
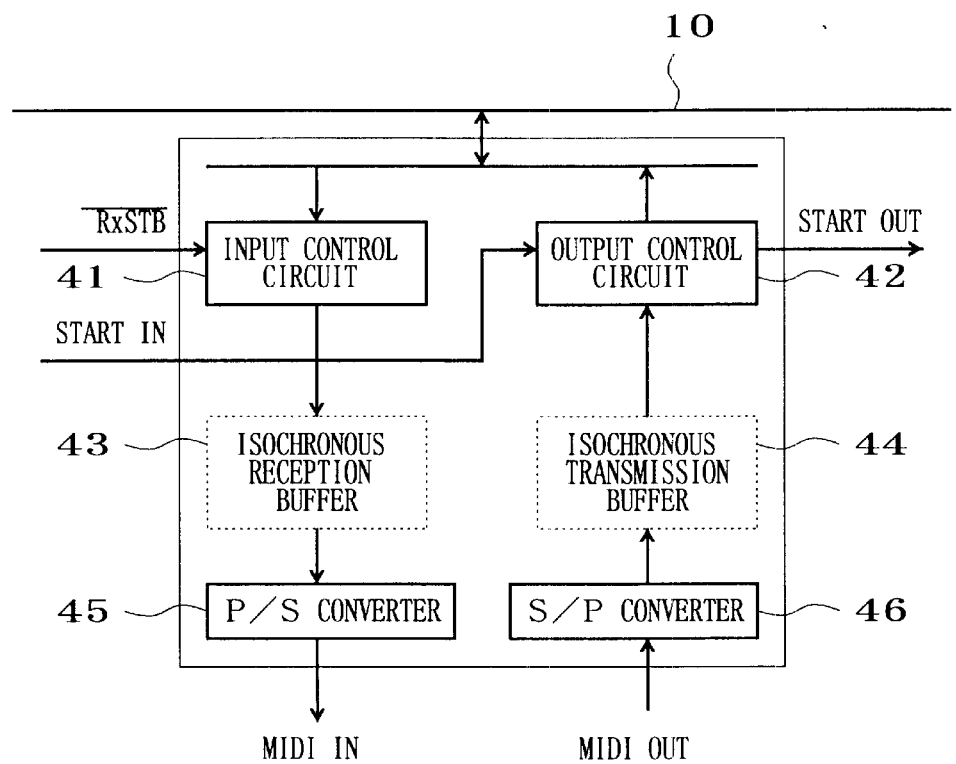
F I G. 4

DATA COMMUNICATION INTERFACE WITH ADJUSTABLE-SIZE BUFFER

BACKGROUND OF THE INVENTION

The present invention relates generally to data communication interface devices for use in systems where data time-varying in predetermined cycles, such as digital audio data, are transmitted to and from a communication network in packets, and also relates to a data communication system and a data communication node include the data communication interface devices.

Data communication techniques using a communication network can be classified roughly into the synchronous type and the asynchronous type. According to the synchronous-type data communication technique, a dedicated synchronizing signal line etc. are provided between transmitting and receiving ends and data are transmitted in response to each synchronizing signal so that the receiving end is allowed to accurately reproduce original data on the basis of the transmitted data. Thus, the synchronous-type data communication technique is suitable for communication of digital audio data and the like for which accurate reproduction of respective time positions of the individual data is required at the receiving end. However, this synchronous-type data communication technique requires separate provision of the synchronizing signal line and other arrangements for synchronizing the transmitting and receiving ends. Further, because the line during communication is occupied by the communication alone, the synchronous-type data communication technique lacks versatility as a means of communication.

The asynchronous-type data communication technique, on the other hand, is suitable for transmission of text data and still picture data such as in personal-computer to personal-computer communication, because it does not require provision of a dedicated synchronizing signal line and the like. However, the asynchronous-type data communication technique can not be suitably used for communication of digital audio data, because information indicative of original time positions of the data would be lost in packet transmission employed in this type of communication.

To avoid the problems encountered by the synchronous- and asynchronous-type data communication technique, a pseudo-synchronous-type data communication technique is employed nowadays. According to this pseudo-synchronous-type data communication technique, each individual node includes a clock oscillator circuit and a clock counter for counting clock pulses generated by the clock oscillator circuit. The transmitting-end node produces a data packet with time data (time stamp), indicative of its time position, attached thereto and transmits the thus-produced data packet onto a communication network data. The receiving-end node compares the time data and a count value of its internal clock counter, modifies the count value with the time data when the compared values have been determined as not identical to or matching each other, and then sequentially reproduces the data on the basis of the thus-modified count value. Such a pseudo-synchronous-type data communication technique is also called an "isochronous" data communication technique, the IEEE1394 protocol is one of the known protocols defining the isochronous data communication technique.

Specifically, because the clock oscillator circuits of the individual networked nodes do not always oscillate at completely the same frequency and some discrepancies may exist between the clock pulse generation timing in these nodes, the pseudo-synchronous-type data communication technique, at each synchronization timing, i.e., upon reception of each time data, adjusts the clock pulse counts in conformity with the time data, to thereby eliminate the discrepancies.

Further, in the pseudo-synchronous-type data communication technique, a FIFO memory capable of storing data of one or more packets is normally provided on a chip constituting an interface device, so as to carry out data transmission/reception on a packet-by-packet basis. Access to the packet data in the FIFO memory is executed via a CPU or a peripheral I/O device. Thus, it is necessary that the FIFO memory have an optimum capacity or size depending on the application.

However, because a more-than-necessary size is allocated to the FIFO memory in order to give priority to the versatility of the chip, the conventional pseudo-synchronous-type data communication technique presents the problem that the FIFO memory would be used wastefully. Conversely, when it is desired to increase the number of connection channels to digital audio equipment, the FIFO memory size is too small to permit a substantial increase in the number of channels. Typical examples of the conventional data communication system using a communication network are disclosed in, for example, U.S. Pat. No. 5,616,879 and Japanese Patent Publication No. HEI-9-93250.

SUMMARY OF THE INVENTION

It is therefore an object of the present invention to provide a data communication interface device which is capable of freely varying a buffer storage size depending on an application and thereby permits data communication with increased efficiency.

It is a further object of the present invention to provide a data communication system and/or a data communication node which use the data communication interface device.

In order to accomplish the above-mentioned object, the present invention provides a data communication interface device for use in at least one of a transmitting node and a receiving node to execute data packet communication between a plurality of nodes via a communication network, which communication interface device comprises: at least one interface chip including a storage section that has a predetermined capacity for buffering a data packet to be transmitted or having been received via the communication network; and a control section that controls the at least one interface chip to thereby control transmission or reception of the data packet to or from the communication network. The total number of the interface chip to be connected to the control section is optionally selectable in such a manner that an overall buffer storage size in the data communication interface device can be adjusted freely by just increasing or decreasing the number of the interface chips. With this arrangement, users can construct an efficient, i.e., waste-free, data communication interface device by just increasing or decreasing the number of the interface chips depending on an application.

For example, where data having a relatively high speed and relatively great size, such as digital audio data, are to be transmitted/received for a plurality of channels, the desired data communication can be carried out by connecting, to the control section, a necessary number of the interface chips each including a storage section of a relatively great capacity. Thus, the overall buffer storage size in the data communication interface device can be apparently increased to permit communication of the great-size data. Further, where data having a relatively low speed and relatively small size, such as MIDI data, are to be transmitted/received for a plurality of channels, the desired data communication can be carried out by connecting, to the control section, a necessary number of the interface chips each including a storage section of a relatively small capacity. Moreover, where it is desired to transmit/receive both great-size data such as digital audio data and small-size data such as MIDI data, the desired communication can be carried out by connecting, to the control section, necessary numbers of the interface chips each including a storage section of a relatively great capacity and the interface chips each including a storage section of a relatively small capacity.

It will be appreciated that the number of the interface chips to be connected to the control section may be determined depending on the capacity of the respective storage sections of the chips. Further, different types of data can be transmitted/received by allocating, to each of the data types, a different interface chip (or chips) to be used for transmission/reception of that type of data. Moreover, a plurality of the interface chips, whose respective buffers have different sizes (i.e., whose respective storage sections have different capacity), may be connected to the control section, so as to provide combinations or groups of the interface chips that are optimal for transmission/reception of the data of the individual types.

BRIEF DESCRIPTION OF THE DRAWINGS

For better understanding of the above and other features of the present invention, the preferred embodiments of the invention will be described in greater detail below with reference to the accompanying drawings, in which:

FIG. 3 is a block diagram showing an exemplary structure of an interface chip that is suitable for transmission/reception of digital audio signals;

FIG. 4 is a block diagram showing an exemplary structure of the interface chip that is suitable for transmission/reception of MIDI signals.

DETAILED DESCRIPTION OF THE PREFERRED EMBODIMENTS

Figure 1:
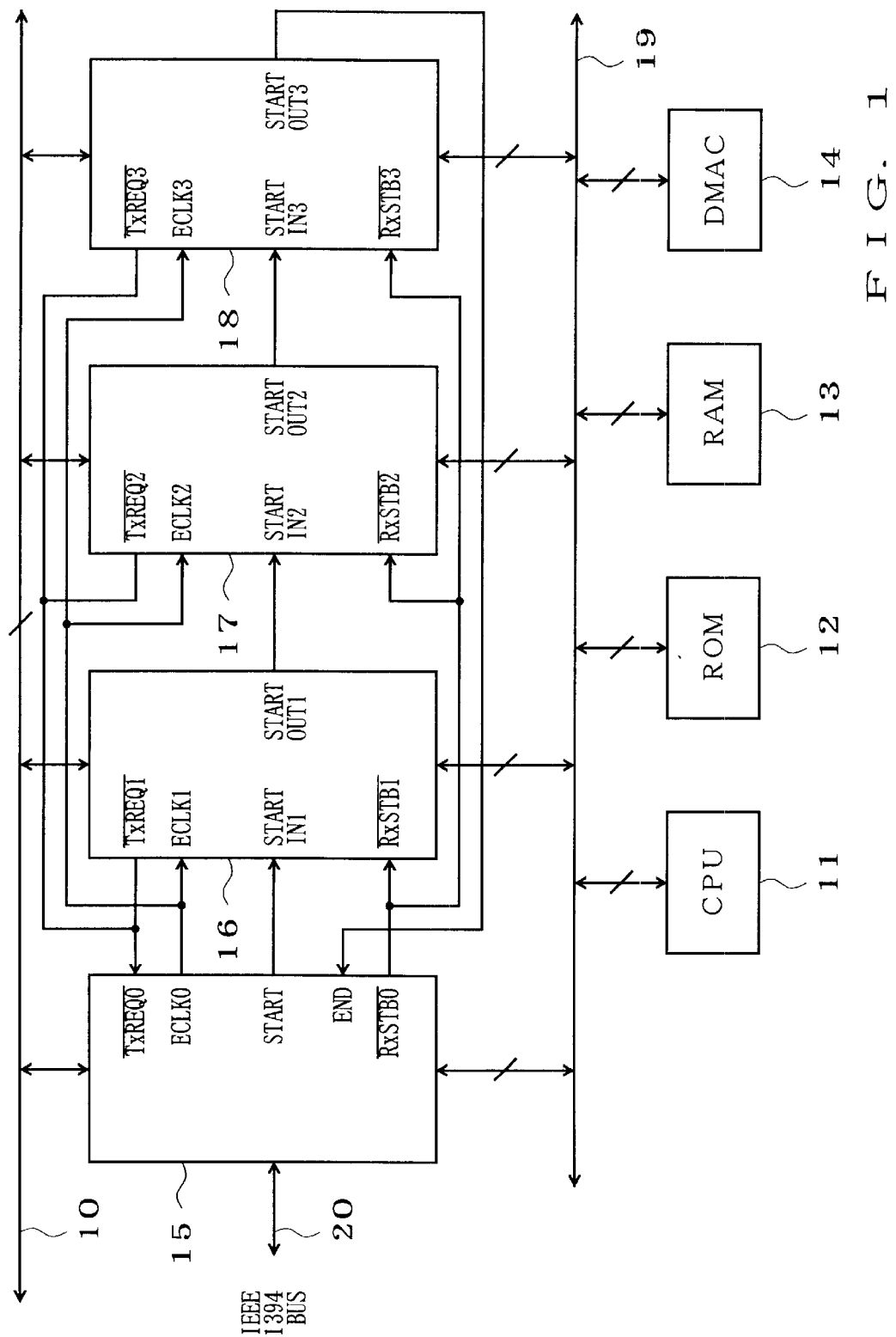
FIG. 1 is a block diagram showing an example of a transmitting/receiving node that contains an interface device arranged in accordance with an embodiment of the present invention.
Figure 2:
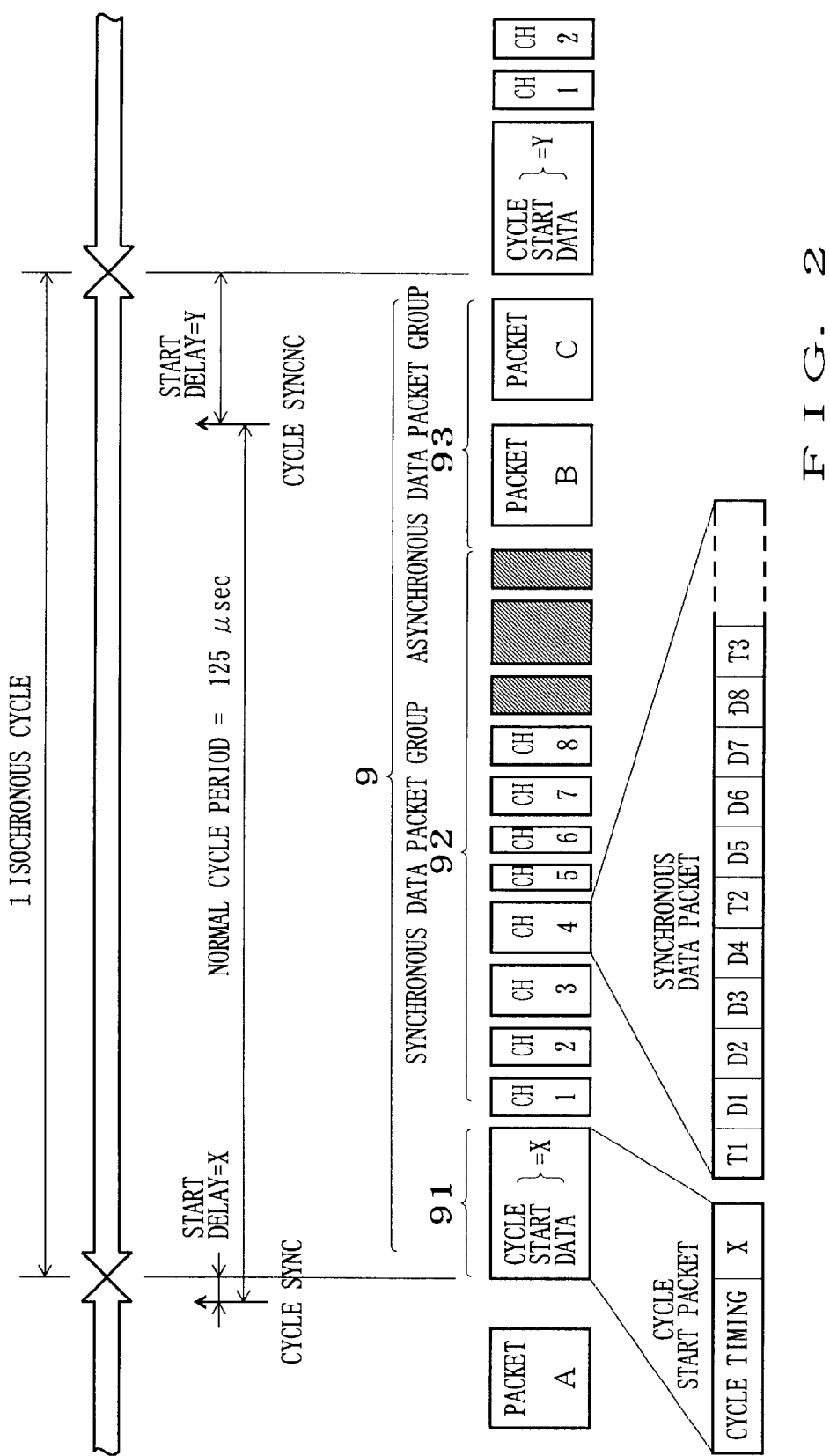
FIG. 2 is a diagram showing an exemplary organization of data communicated between the transmitting/receiving nodes as shown in FIG. 1.

FIG. 1 is a block diagram showing an example of a transmitting/receiving node that contains a data communication interface device arranged in accordance with a preferred embodiment of the present invention. FIG. 2 is a diagram showing an exemplary organization of data communicated to and from the transmitting/receiving node of FIG. 1. The present invention will hereinafter be described in relation to a case where the data communication is carried out on the basis of the aforementioned IEEE1394 communication protocol.

Whereas FIG. 1 shows only one transmitting/receiving node connected to an IEEE1394 serial bus 20, a plurality of other nodes, including one only performing data transmission and one only performing data reception, may be connected via the serial bus 20.

Here, the preferred embodiment will be described in relation to a case where one of the other nodes sequentially outputs cycle start packet signals corresponding to synchronizing signals (each labelled "cycle sync" in FIG. 2) having a normal cycle period of 125 μsec. and the transmitting/receiving node of FIG. 1 transmits or receives a data train, as shown in FIG. 2, to and from the serial bus 20.

The transmitting/receiving node of FIG. 1 includes a CPU 11 that operates in response to clock pulses of a predetermined frequency (e.g., 24.576 MHz with a 40 nsec. period.) generated by a built-in crystal oscillator (not shown). A plurality of data, arranged in a time series having a predetermined sampling period T, are sequentially generated by a microcomputer system that comprises the CPU 11, a ROM 12 and a RAM 13. By means of a chip controller 15 and interface chips 16 to 18, the thus-generated data are output onto the serial bus 20 and data are received from the outside world via the serial bus 20. Data transfer to the chip controller 15 and interface chips 16 to 18 is executed under the control of a direct memory access controller (DMAC) 14. These chip controller 15 and interface chips 16 to 18 are interconnected via an internal bus 10. Further, the CPU 11, ROM 12, RAM 13, DMAC 14, chip controller 15 and interface chips 16 to 18 are interconnected via a CPU bus 19. In addition, the interface chips 16 to 18 are connected together in a cascade fashion via respective start input and out terminals START_IN1–START_IN3 and START_OUT1–START_OUT3.

Where the transmitting/receiving node of FIG. 1 is contained in an audio reproduction device such as a CD (Compact Disk) player, successive sample data of each reproduced digital audio signal are output to the serial bus 20. Where the transmitting/receiving node of FIG. 1 is contained in a tone synthesizer device that synthesizes tone sample data in real time, successive sample data of a synthesized tone waveform are output to the serial bus 20. Note that the sampling period T of the output data from the transmitting/receiving node is variable depending on a source of the data.

The CPU 11 can also function as a 32-bit running counter for counting the clock pulses of the predetermined frequency generated by the unillustrated crystal oscillator and output time stamp data corresponding to its counted values.

The chip controller 15 controls the interface chips 16 to 18 to carry out data exchange with the serial bus 20. The interface chips 16 to 18, each containing a buffer register where input and output operations are performed asynchronously, exchange data with the serial bus 20 via the chip controller 15. A FIFO-type memory is used as the buffer register.

In synchronism with a predetermined transmission interrupt cycle (synchronizing signal "cycle sync" output from the above-mentioned other transmitting/receiving node), the chip controller 15 produces a data train (hereinafter referred to as a "cycle packet train") 9 corresponding to one isochronous cycle as shown in FIG. 2 on the basis of data temporarily stored in the interface chips 16 to 18 and passes the thus-produced cycle packet train to the serial bus 20.

As illustratively shown in FIG. 2, the cycle packet train 9 is comprised of a cycle start packet 91, a synchronous data packet group 92 and an asynchronous data packet group 93. The cycle start packet 91 consists of 32-bit data; the data of the upper 20 bits indicates cycle timing of the cycle packet train 9 while the data of the lower 12 bits is cycle start data X indicating a time with which transmission of the cycle packet train 9 is delayed behind the corresponding synchronizing signal generated on a communication network (not shown). Using the time data contained in the cycle start packet 91, the running counter (CPU 11) of the transmitting/receiving node is set to a predetermined count value, and thus a common time standard is provided to all of the nodes on the network.

The synchronous data packet group 92 is comprised of P (P is an arbitrary plural number) data packets that are to be subjected to pseudo-synchronous signal processing. In FIG. 2, there are shown, just by way of example, eight synchronous data packets of channel 1 to channel 8 to be transmitted and three synchronous data packets received from other nodes. The number P of the channels in the synchronous data packet group 92 can be set optionally. Each of the synchronous data packets includes a plurality of data groups, and each of the data groups comprises a predetermined number Q of data and time stamp data indicative of a time position of any one of the Q data (first or forefront data in the illustrated example); in the illustrated example, each of the data groups comprises four data and one time stamp. Namely, in FIG. 2, one time stamp data T1, T2 is attached to every four data D1–D4, D5–D8. The time stamp data T1 indicates a time position of the forefront data D1 in the first data group, and the time stamp data T2 indicates a time position of the forefront data D5 in the second data group. Thus, each of the synchronous data packets comprises two or more data groups each consisting of (Q+1) data. Because digital audio data are communicated in the illustrated example, data transmission may be carried out with some of the data groups containing less than Q data, although not specifically described here.

The asynchronous data packet group 93 is comprised of R (R is an arbitrary plural number) data packets that are to be subjected to asynchronous signal processing; in FIG. 2, there are shown, just by way of example, two data packets B and C. It is not necessarily essential for the cycle packet train 9 to contain such an asynchronous data packet.

The chip controller 15 includes a terminal END for receiving an output signal from an output terminal START_OUT3 of the last or third interface chip 18, and another terminal TxREQ0 for inputting an "active-low" (i.e., becoming active in the LOW state) transmission enable signal Tx from an output terminal TxREQ1–TxREQ3 of any of the interface chips 16 to 18. The chip controller 15 also includes a terminal RxSTB0 for supplying an active-low (becoming active in the LOW state) reception enable signal Rx to an input terminal RxSTB1–RxSTB3 of any of the interface chips 16 to 18, a terminal START for supplying a start signal to a terminal START_IN1 of the first interface chip 16, and a terminal ECLK0 for supplying a clock pulse signal ECLK to terminals ECLK1 to ECLK3 of the interface chips 16 to 18.

Each of the interface chips 16 to 18 includes the above-mentioned clock input terminal ECLK1–ECLK3 for receiving the clock pulse signal ECLK, start input terminal START_IN1–START_IN3, reception-enable-signal input terminal RxSTB1–RxSTB3 for receiving the reception enable signal Rx, transmission-enable-signal input terminal TxREQ1–TxREQ3 for outputting the transmission enable signal Tx, and start output terminal START_OUT1–START_OUT3 for outputting a start-out signal START_OUT. With respect to the start signal START–IN, the interface chips 16 to 18 are connected together in a daisy chain so that the start signal is sequentially passed through these interface chips. Let's assume here that each of the interface chips 16 to 18 is capable of transmitting and/or receiving the synchronous data packet of one channel at a time.

FIG. 3 is a block diagram showing an exemplary structure of the interface chip that is suitable for transmission/reception of digital audio signals (typically, PCM waveform sample data). The interface chip shown in FIG. 3 includes an input control circuit 31, an output control circuit 32, an isochronous reception buffer 33, an isochronous transmission buffer 34 and a DSP (Digital Signal Processor) 35. Upon receipt of a low-level reception enable signal RXSTB from the chip controller 15, the input control circuit 31 receives packet data from the internal bus 10, and divides the received packet data into a header portion and a data portion. If it has been judged from the header information that the packet data are to be actually received by the chip in question, the input control circuit 31 transfers the packet's data portion to the isochronous reception buffer 33, but if not, the input control circuit 31 ignores the packet data. When a start signal START_IN is supplied to the start input terminal with data to be transmitted stored in the isochronous transmission buffer 34, the output control circuit 32 delivers the stored data of the buffer 34 to the internal bus 10 after attaching header information to the data. Then, at the same time the last data is delivered from the isochronous transmission buffer 34 to the internal bus 10, the output control circuit 32 supplies a start output signal START_OUT to the next interface chip. The DSP 35 performs an exchange of digital audio signals, to be transmitted or having been received, between the isochronous reception buffer 33 and isochronous transmission buffer 34 and the CPU bus 19 (FIG. 1). Each of these buffers 33 and 34 comprises a FIFO memory as previously stated, and it is sufficient for the FIFO memory to only have a capacity corresponding to the overall size of the synchronous data packet of one channel. In an alternative, the buffers 33 and 34 may be connected to the CPU bus 19, without providing the DSP 35 for the data exchange purposes.

FIG. 4 is a block diagram showing an exemplary structure of the interface chip that is suitable for transmission/reception of MIDI signals. The interface chip shown in FIG. 4 includes an input control circuit 41, an output control circuit 42, an isochronous reception buffer 43, an isochronous transmission buffer 44, a parallel-to-serial (P/S) converter 45 and a serial-to-parallel (S/P) converter 46. The input control circuit 41 and output control circuit 42 in FIG. 4 are similar in construction and operation to those in FIG. 3 and hence will not be detailed here. Although the isochronous reception buffer 43 and isochronous transmission buffer 44 may be omitted because MIDI signals are generally communicated more slowly than the IEEE1394-based communication speed, it is desirable to employ a buffer of some capacity for timing and data developing purposes. This is why the isochronous reception buffer 43 and isochronous transmission buffer 44 are denoted in FIG. 4 in dotted-line blocks. The parallel-to-serial converter 45 converts parallel MIDI data, stored in the isochronous reception buffer 43, into serial form and passes the converted serial data to the CPU bus 19 (FIG. 1). The serial-to-parallel converter 46 converts serial MIDI data, received from the CPU bus 19, into parallel form and passes the converted parallel data to the isochronous transmission buffer 44. Note that in the case where the isochronous reception buffer 43 and isochronous transmission buffer 44 are not provided, registers contained in the parallel-to-serial and serial-to-parallel converters 45 and 46 perform the necessary buffering function.

Data of the cycle packet train as shown in FIG. 2 can be communicated by a combined use of the interface chip suitable for digital audio signal communication as shown in FIG. 3 and the interface chip suitable for MIDI signal communication as shown in FIG. 4.

Now, behavior of the interface device of FIG. 1 will be described in detail with reference to a time chart shown in FIG. 5.

Figure 5:
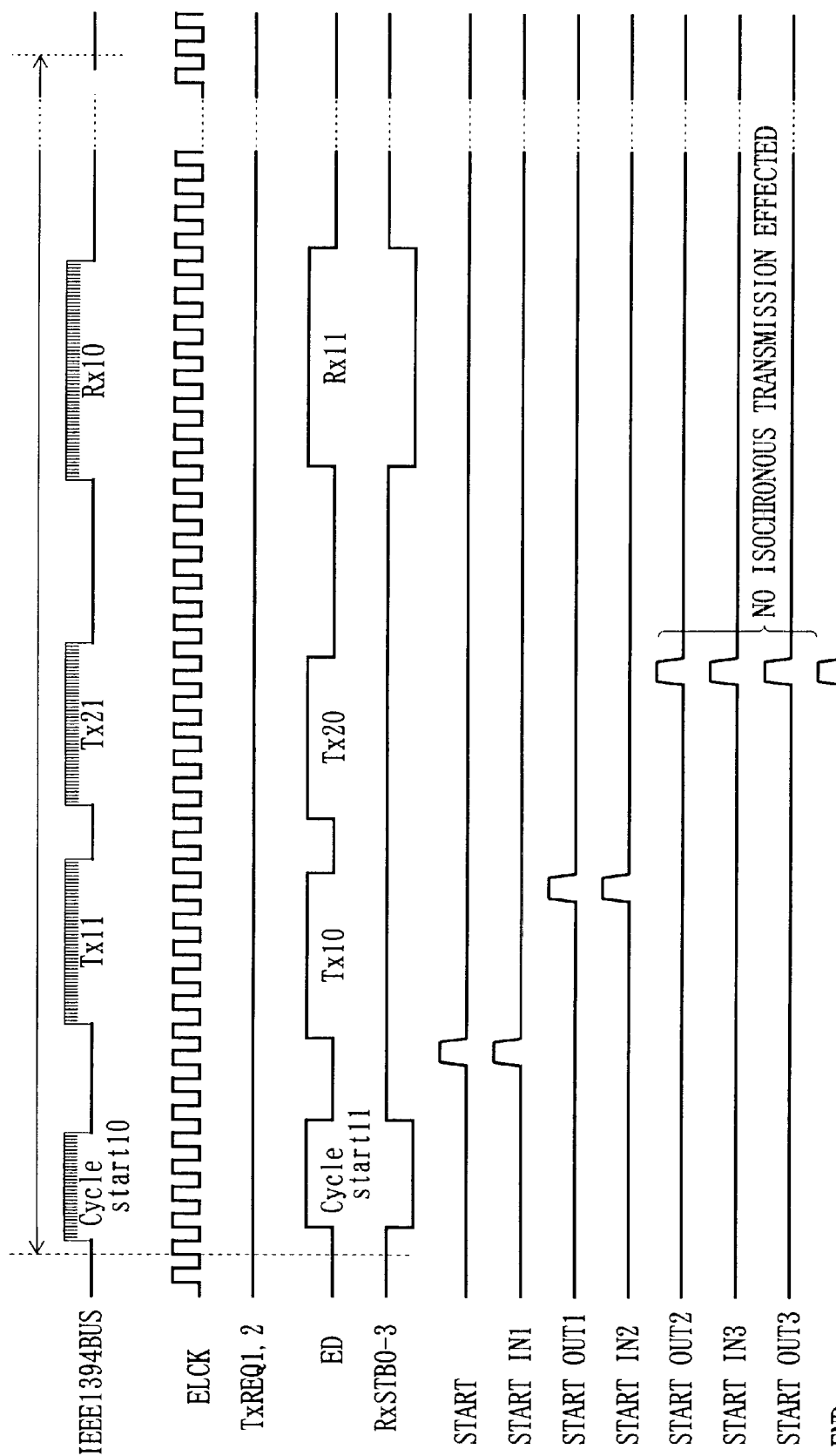
FIG. 5 is a time chart explanatory of behavior of the interface device of FIG. 1.

In FIG. 5, data Tx10 and Tx20 have been prewritten in the respective isochronous transmission buffers of the interface chips 16 and 17, in order to send these data Tx10 and Tx20 onto the serial bus 20 connecting to the communication network. Upon receipt of cycle start data, these data Tx10 and Tx20 are transmitted via the serial bus 20. Thus, in a section of FIG. 5 labelled "TxREQ1, 2", there is shown a situation where active-low transmission enable signals Tx are being output from the output terminals TxREQ1 and TxREQ2 of the interface chips 16 and 17 to the chip controller 15. At the same time cycle start data Cycle start10 is sent onto the serial bus 20 connecting to the communication network in such a situation, the chip controller 15 receives the cycle start data Cycle start10 and converts the cycle start data Cycle start10 into parallel data Cycle start11 as shown in a section of FIG. 5 labelled "ED". Then, the chip controller 15 passes the converted parallel data Cycle start11 to the CPU 11 and also outputs a reception enable signal Rx to the input terminal RxSTB1–RxSTB3 of each of the interface chips 16 to 18 as shown in a section of FIG. 5 labelled "RxSTB0–3". The CPU 11, having received the cycle start signal Cycle start11, adjusts a count value of its internal running counter to coincide with a value indicated by time data contained in the signal. Upon reception of the cycle start signal Cycle start10, the chip controller 15 supplies a start signal START_IN to the first interface chip 16. In synchronism with the supply of the start signal START_IN, the output control circuit 32 or 42 (FIG. 3 or 4) of the interface chip 16 delivers the data Tx10 stored in the isochronous transmission buffer 34 or 44 (FIG. 3 or 4) to the internal bus 10 after attaching header information to the data a Tx10. Then, the chip controller 15 converts the data Tx10 received via the internal bus 10 into serial data Tx11 and outputs the converted serial data Tx11 to the serial bus 20 connecting to the communication network.

When the transmission of the data Tx10 is completed, the output control circuit 32 or 42 (FIG. 3 or 4) of the interface chip 16 passes the start signal START_IN on to the next or second interface chip 17. In response to the start signal START_IN from the interface chip 16, the output control circuit 32 or 42 (FIG. 3 or 4) of the second interface chip 17 delivers the data Tx20 stored in the isochronous transmission buffer 34 or 44 (FIG. 3 or 4) to the internal bus 10 after attaching header information to the data Tx20, similarly to the first interface chip 16. Then, the chip controller 15 converts the data Tx20 received via the internal bus 10 into serial data Tx21 and outputs the converted serial data Tx21 to the serial bus 20 connecting to the communication network. Then, the start signal START_IN is passed on to the last interface chip 18; in this case, however, the start signal START_IN is immediately passed from the last interface chip 18 to the end terminal END of the chip controller 15 because no data to be transmitted is stored in the transmission buffer 34 or 44 (FIG. 3 or 4) of the chip 18. Then, after the chip controller 15 confirms that the start signal START_IN has been sent back to its end terminal END, the data transmission at the current isochronous timing is terminated.

Thereafter, when a synchronous data packet Rx10 is sent from another node onto the serial bus 20 connecting to the communication network, the chip controller 15 converts the data packet Rx10 into parallel data Rx11 to pass the converted parallel data Rx11 to the internal bus 10 and also outputs a reception enable signal Rx to the input terminal RxSTB1–RxSTB3 of each of the interface chips 16 to 18.

Upon receipt of the reception enable signal Rx via the input terminal RxSTB1–RxSTB3, each of the interface chips 16 to 18 inputs the data on the bus 10 to its input control circuit 31 or 41 (FIG. 3 or 4). The input control circuit 31 or 41 of each of the chips 16 to 18, having received the packet data via the internal bus 10, divides the received packet data into a header portion and a data portion. If it has been judged from the header information that the packet data are to be actually received by the chip, the input control circuit 31 loads the packet's data portion into the isochronous reception buffer 33 or 43 (FIG. 3 or 4). Generally, the header information of packet data includes channel information indicative of a channel allocated to the packet. Because the interface chips 16 to 18 are provided in corresponding relation to the individual channels as noted earlier, the data portion of the packet data is loaded into the reception buffer 33 or 43 of a corresponding one of the chips 16 to 18, in accordance with the channel information included in the header portion of the received packet data. As previously mentioned, there are employed two types of channel, i.e., audio channel and MIDI channel, and data with the channel information on the audio channel are received by any one of the interface chips 16 to 18 arranged as shown in FIG. 3 while data with the channel information on the MIDI channel are received by any one of the interface chips 16 to 18 arranged as shown in FIG. 4. Let's assume here that it is the first interface chip 16 that should actually receive the data Rx11. Upon completion of the reception of the data Rx11, the CPU 11 reads in the data Rx11 for reproduction of the data Rx11.

Note that although the interface device of FIG. 1, comprising the cascade-connected three interface chips, can transmit synchronous data packets of three channels as shown in FIG. 5, it is unable to transmit synchronous data packets of eight channels as shown in FIG. 2. However, in order to transmit the synchronous data packets of eight channels, it is only necessary that eight interface chips be cascade-connected via respective start input and output terminals. In the case where the eight interface chips are provided, for example, the first four interface chips may be the ones suitable for transmission/reception of digital audio signal as shown in FIG. 3, while the remaining four interface chips may be the ones suitable for transmission/reception of MIDI signal as shown in FIG. 4. By employing various combinations of the different interface chips like this, it is possible to freely change the size of transmitted and received data depending on the application, and thus the data communication efficiency can be greatly enhanced. As previously noted, the storage capacity of the transmission and reception buffers in the interface chip suitable for transmission/reception of MIDI signal can be made relatively small.

Whereas the preferred embodiment has been described above in relation to the case where the transmission and reception buffers 33 or 43 and 34 or 44 in each of the interface chips are unable to transmit a synchronous data packet of more than one channel, these buffers may each have a capacity sufficient to buffer the synchronous data packets of a plurality of channels, in which case the number of the cascade-connected interface chips can be reduced. Further, in the node dedicated to transmission or reception, it is of course possible to omit the reception buffer (33 or 43 in FIG. 3 or 4) or the transmission buffer (34 or 44 in FIG. 3 or 4) and other circuitry related thereto.

In summary, the interface device according to the present invention affords the superior benefit that it can freely change a buffer storage size depending on the application, to thereby achieve an increased data communication efficiency.

What is claimed is:

1. A data communication interface device for use in at least one of a transmitting node and a receiving node to execute data packet communication between a plurality of nodes via a communication network, said data communication interface device comprising:

at least one interface chip including a storage section that has a predetermined capacity for buffering a data packet to be transmitted or having been received via the communication network; and a control section that controls said at least one interface chip to thereby control transmission or reception of the data packet to or from the communication network, wherein a total number of said interface chip to be connected to said control section is optionally selectable in such a manner that an overall buffer storage size in said data communication interface device can be adjusted by increasing or decreasing the number of said interface chip.

2. A data communication interface device as recited in claim 1 which further comprises an internal bus that interconnects said control section and said interface chip, and wherein an optional number of said interface chip is connected to said internal bus, data are transferred in a parallel fashion between said control section and said interface chip via said internal bus, and said control section has a function of executing serial-to-parallel conversion and parallel-to-serial conversion of data between said internal bus and a serial bus connecting to the communication network.

3. A data communication interface device as recited in claim 1 wherein said nodes connected to the communication network operate asynchronously with each other, wherein for data communication between the nodes, a predetermined one of said nodes transmits, to the communication network, standard time signals in predetermined isochronous cycles, a given transmitting node from among said nodes transmits, to the communication network, a plurality of data packets in one of the isochronous cycles, each of the data packets including data arranged in a time series and time stamp data indicative of a time position of the data packet, and a given receiving node from among said nodes receives, from the communication network, the data packets along with the standard time signals and reproduces respective time positions of individual data in the received data packets on the basis of the time stamp data and the standard time signals, wherein said data communication interface device is provided in said transmitting node and includes a specific number of said interface chips corresponding at least to a total number of the data packets to be transmitted in one of the isochronous cycles, and the data packets to be transmitted in one of the isochronous cycles are buffered in respective ones of said interface chips, and wherein said control section transmits the data packets buffered in the respective interface chips to the communication network in a time-serial fashion while sequentially selecting the data packets to be transmitted.

4. A data communication interface device as recited in claim 1 wherein said nodes connected to the communication network operate asynchronously with each other, wherein for data communication between the nodes, a predetermined one of said nodes transmits, to the communication network, standard time signals in predetermined isochronous cycles, a given transmitting node from among said nodes transmits, to the communication network, a plurality of data packets in one of the isochronous cycles, each of the data packets including data arranged in a time series and time stamp data indicative of a time position of the data packet, and a given receiving node from among said nodes receives, from the communication network, the data packets along with the standard time signals and reproduces respective time positions of individual data in the received data packets on the basis of the time stamp data and the standard time signals, wherein said data communication interface device is provided in said receiving node, and said control section transfers the data packets received in one of the isochronous cycles to said at least one interface chip.

5. A data communication interface device as recited in claim 1 wherein said interface chip includes a transmission memory section that buffers a data packet to be transmitted, and a reception memory section that buffers a data packet having been received.

6. A data communication interface device as recited in claim 1 which comprises a plurality of said interface chips and wherein one or more of said interface chips differ in capacity of said storage section from a rest of said interface chips.

7. A data communication interface device for use in a transmitting node to execute data packet communication between a plurality of nodes via a communication network, said data communication interface device comprising:

at least one interface chip including a storage section that has a predetermined capacity for buffering a data packet to be transmitted via the communication network; and a control section that controls said at least one interface chip to thereby control transmission of the data packet to the communication network, wherein a total number of said interface chip to be connected to said control section is optionally selectable in such a manner that an overall buffer storage size in said data communication interface device can be adjusted by increasing or decreasing the number of said interface chip.

8. A data communication interface device as recited in claim 7 wherein said nodes connected to the communication network operate asynchronously with each other, wherein for data communication between the nodes, a predetermined one of said nodes transmits, to the communication network, standard time signals in predetermined isochronous cycles, a given transmitting node from among said nodes transmits, to the communication network, a plurality of data packets in one of the isochronous cycles, each of the data packets including data arranged in a time series and time stamp data indicative of a time position of the data packet, and a given receiving node from among said nodes receives, from the communication network, the data packets along with the standard time signals and reproduces respective time positions of individual data in the received data packets on the basis of the time stamp data and the standard time signals, wherein said data communication interface device includes a specific number of said interface chips corresponding at least to a total number of the data packets to be transmitted in one of the isochronous cycles, and the data packets to be transmitted in one of the isochronous cycles are buffered in respective ones of said interface chips, and wherein said control section transmits the data packets buffered in the respective interface chips to the communication network in a time-serial fashion while sequentially selecting the data packets to be transmitted.

9. A data communication interface device as recited in claim 7 which includes a specific number of said interface chips corresponding at least to a total number of the data packets to be transmitted within a predetermined time period, the data packets to be transmitted in the predetermined time period being buffered in respective ones of said interface chips, wherein said control section generates a transmission start instruction when transmission of the data packets is to be initiated in the predetermined time period, and wherein said interface chips are cascade-connected in such a manner that the transmission start instruction generated by said control section is sequentially transferred to said interface chips one after another, and each of said interface chips, upon receipt of the transmission start instruction, retrieves the data packet buffered in said interface chips and transmits the data packets to the communication network via said control section.

10. A data communication interface device as recited in claim 9 wherein each of said interface chips, upon receipt of the transmission start instruction, supplies said control section with the data packet to be transmitted and then passes the transmission start instruction on to a next one, if any, of said interface chips, a last one of said interface chips sends the transmission start instruction back to said control section after having supplied said control section with the data packet to be transmitted, and any of said interface chips having buffered therein no data packet to be transmitted passes the transmission start instruction on to a next one, if any, of said interface chips immediately upon receipt of the transmission start instruction, and wherein said control section sequentially transmits, to the communication network, the data packets supplied sequentially by said interface chips, and said control section terminates a data packet transmission mode in said predetermined time period when the transmission start instruction is sent back from the last interface chip.

11. A data communication interface device as recited in claim 10 wherein at least one of said interface chips includes a storage section that buffers a data packet received via the communication network, and wherein before or after the data packet transmission mode in said predetermined time period, said control section is placed in a reception mode to receive a data packet communicated via the communication network within said predetermined time period and transfers, to at least one of said interface chips, the data packet received in the reception mode so that the data packet is received by the one interface chip.

12. A data communication interface device as recited in claim 7 which comprises a plurality of said interface chips and wherein one or more of said interface chips differ in capacity of said storage section from a rest of said interface chips.

13. A data communication system comprising a plurality of nodes interconnected by a communication network for communicating therebetween a data packet via the communication network, each of said nodes including an interface device to execute data packet communication, said interface device comprising:

at least one interface chip including a storage section that has a predetermined capacity for buffering a data packet to be transmitted or having been received via the communication network; and a control section that controls said at least one interface chip to thereby control transmission or reception of the data packet to or from the communication network, wherein a total number of said interface chip to be connected to said control section is optionally selectable in such a manner that an overall buffer storage size in said data communication interface device can be adjusted by increasing or decreasing the number of said interface chip.

14. A data communication node for communicating a data packet with another node via a communication network, said data communication node including an interface device to execute data packet communication, said interface device comprising:

at least one interface chip including a storage section that has a predetermined capacity for buffering a data packet to be transmitted or having been received via the communication network; and a control section that controls said at least one interface chip to thereby control transmission or reception of the data packet to or from the communication network, wherein a total number of said interface chip to be connected to said control section is optionally selectable in such a manner that an overall buffer storage size in said data communication interface device can be adjusted by increasing or decreasing the number of said interface chip.

* * * * *